US010747257B1

(12) United States Patent
Frazier

(10) Patent No.: US 10,747,257 B1
(45) Date of Patent: Aug. 18, 2020

(54) ADJUSTABLE PEDAL SYSTEM

(71) Applicant: Ryan Frazier, Dover, FL (US)

(72) Inventor: Ryan Frazier, Dover, FL (US)

( * ) Notice: Subject to any disclaimer, the term of this patent is extended or adjusted under 35 U.S.C. 154(b) by 0 days.

(21) Appl. No.: 16/740,804

(22) Filed: Jan. 13, 2020

Related U.S. Application Data

(60) Provisional application No. 62/792,025, filed on Jan. 14, 2019.

(51) Int. Cl.
| G05G 1/40 | (2008.04) |
| G05G 1/44 | (2008.04) |
| B60T 7/06 | (2006.01) |
| B60K 26/02 | (2006.01) |
| G05G 1/36 | (2008.04) |

(52) U.S. Cl.
CPC ............... *G05G 1/40* (2013.01); *B60K 26/02* (2013.01); *B60T 7/06* (2013.01); *G05G 1/36* (2013.01); *G05G 1/44* (2013.01); *B60K 2026/026* (2013.01); *G05G 2700/02* (2013.01)

(58) Field of Classification Search
CPC . G05G 1/40; G05G 1/405; G05G 1/44; B60T 7/06; B60K 26/02
See application file for complete search history.

(56) References Cited

U.S. PATENT DOCUMENTS

| 4,875,385 | A | * | 10/1989 | Sitrin | ........................ | B60T 7/04 |
| | | | | | | 74/512 |
| 5,839,326 | A | * | 11/1998 | Song | ........................ | B60T 7/06 |
| | | | | | | 74/562 |
| 7,370,554 | B2 | * | 5/2008 | Djordjevic | ............. | B60K 26/02 |
| | | | | | | 74/512 |
| 2015/0344005 | A1 | * | 12/2015 | Shand | ..................... | B60T 7/042 |
| | | | | | | 74/514 |

FOREIGN PATENT DOCUMENTS

DE          10354377 A1 *   6/2005   ............. B60K 26/02

* cited by examiner

*Primary Examiner* — Luis A Gonzalez

(57) ABSTRACT

An adjustable pedal for a vehicle has readily accessible adjustment mechanisms. An adjustment component has a first leg and also has a cross leg secured in the passenger compartment of the vehicle. A slot extends horizontally in the first leg with horizontal first alignment holes above and below the slot. Bolts couple a slide block to the first alignment holes at a vertical position of comfort to a driver. A brake pedal has an upper end pivotably coupled to the slide block and has a lower end adapted to be depressed by the driver. A foot pad is coupled to the lower end of the brake pedal. A plurality of elevationally spaced holes are in the brake pedal. Bolts couple the foot pad to the brake pedal at a horizontal position of comfort for the driver.

7 Claims, 9 Drawing Sheets

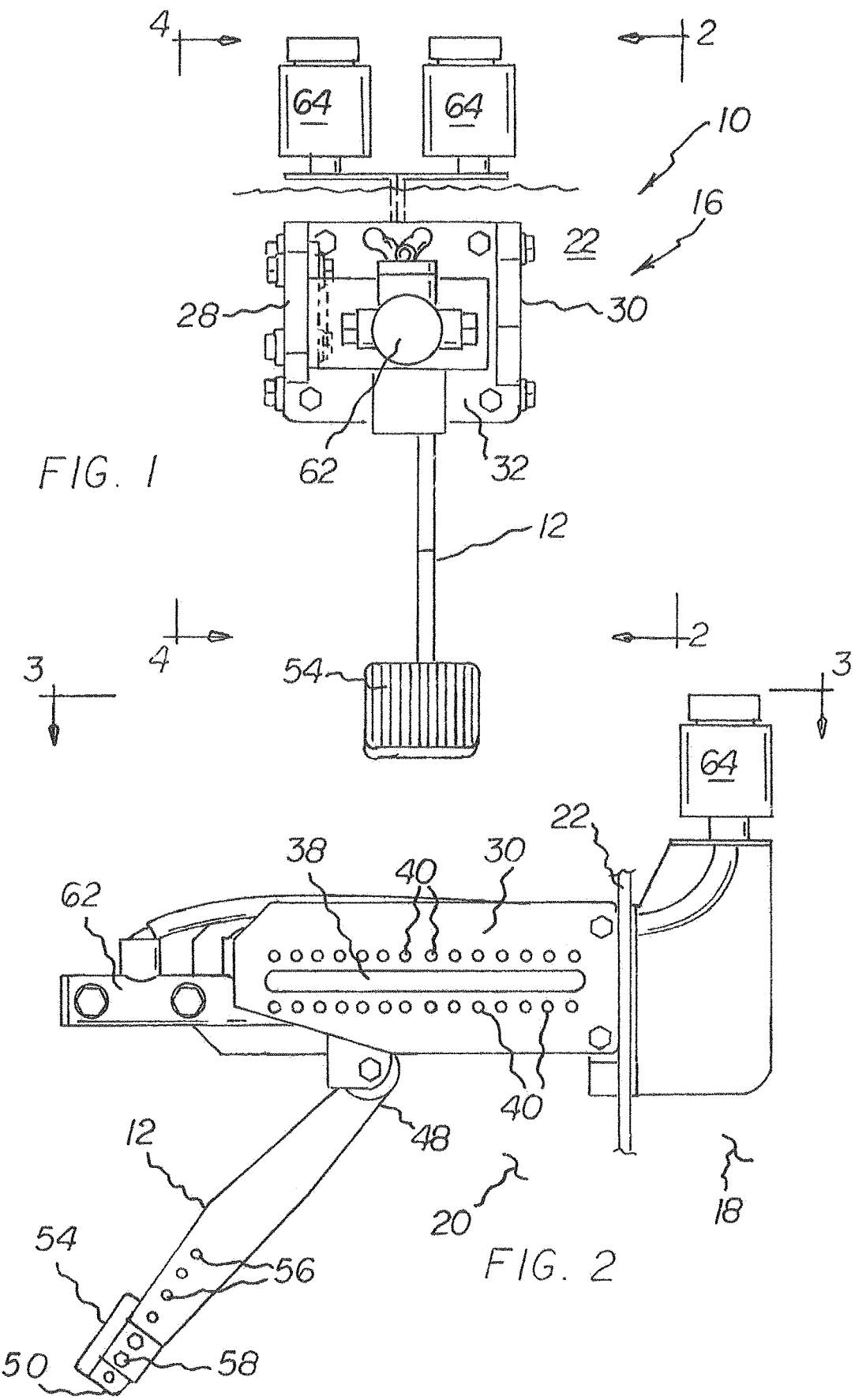

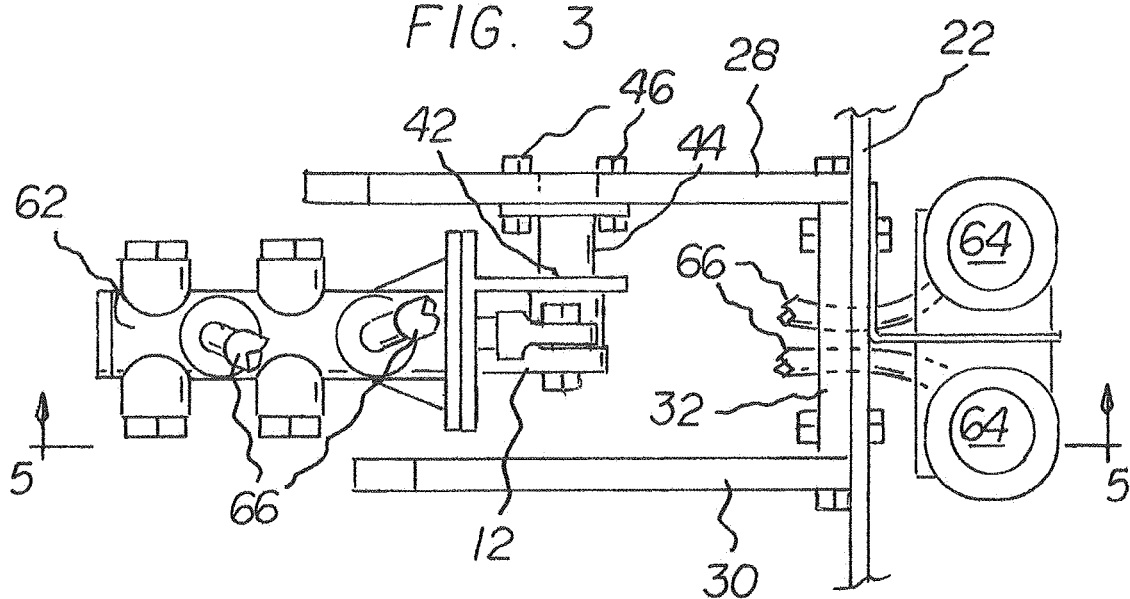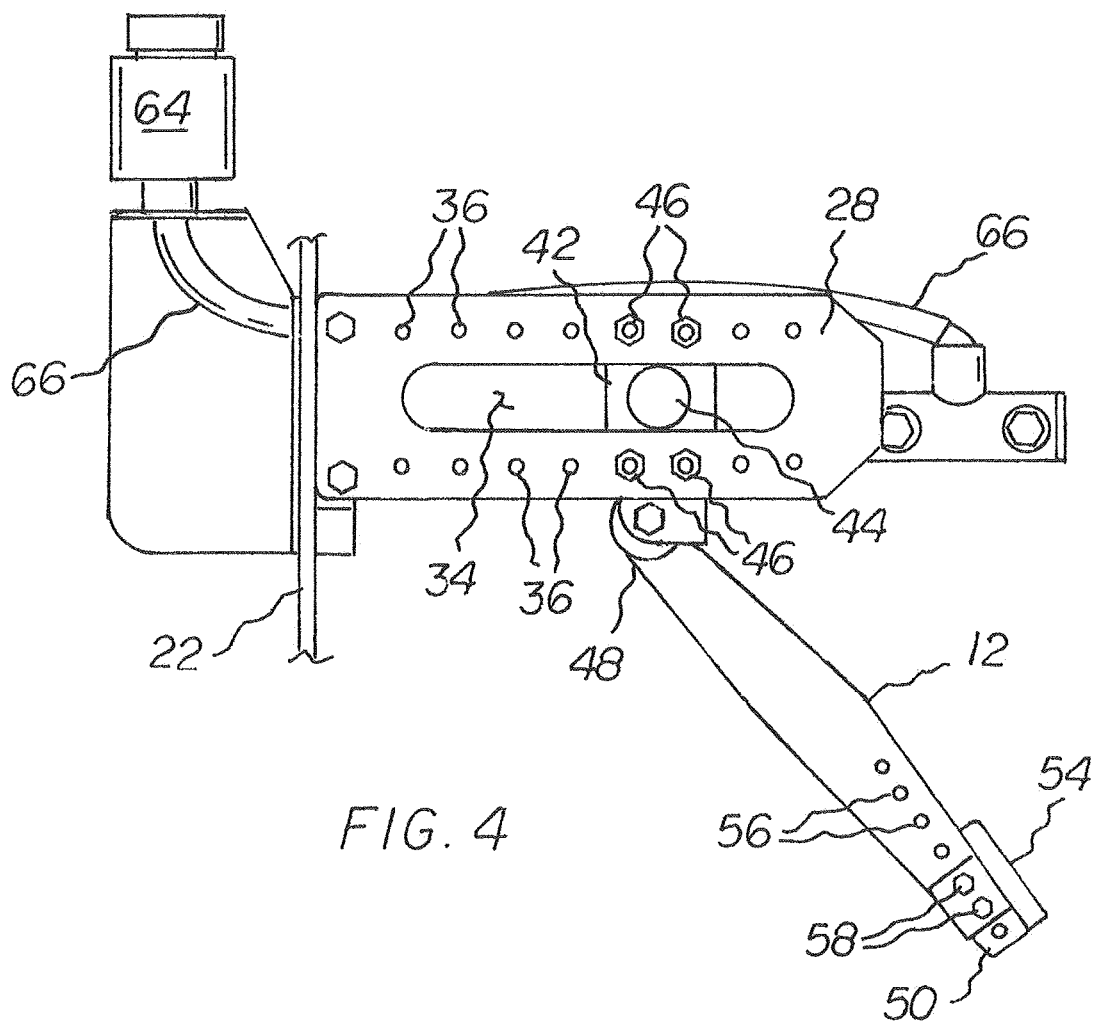

ADJUSTABLE PEDAL SYSTEM

RELATED APPLICATION

This non-provisional application is based upon Provisional Application No. 62/792,025 filed Jan. 14, 2019, which application is incorporated herein by reference.

BACKGROUND OF THE INVENTION

Field of the Invention

The present invention relates to an adjustable pedal system and more particularly pertains to positioning pedals at a proper location for suiting a driver in a safe, comfortable, convenient and economical manner.

Description of the Prior Art

The use of vehicle pedal systems of known designs and configurations is known in the prior art. More specifically, vehicle pedal systems of known designs and configurations previously devised and utilized for the purpose of positioning pedals of vehicles to suit a driver are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, they do not describe an adjustable pedal system that allows positioning pedals at a proper location for suiting a driver in a safe, comfortable, convenient and economical manner.

In this respect, the adjustable pedal system according to the present invention substantially departs from the conventional concepts and designs of the prior art, and in doing so provides an apparatus primarily developed for the purpose of positioning pedals at a proper location for suiting a driver in a safe, comfortable, convenient and economical manner.

Therefore, it can be appreciated that there exists a continuing need for a new and improved adjustable pedal system which can be used for positioning pedals at a proper location for suiting a driver in a safe, comfortable, convenient and economical manner. In this regard, the present invention substantially fulfills this need.

SUMMARY OF THE INVENTION

In view of the disadvantages inherent in the known types of vehicle pedal systems of known designs and configurations now present in the prior art, the present invention provides an improved adjustable pedal system. As such, the general purpose of the present invention, which will be described subsequently in greater detail, is to provide a new and improved adjustable pedal system and method which has all the advantages of the prior art and none of the disadvantages.

To attain this, from a broad viewpoint, the present invention essentially comprises an adjustable pedal. First provided is a brake pedal for a vehicle. The vehicle has a passenger compartment. The brake pedal has readily accessible adjustment mechanisms.

Next provided is an adjustment component in the passenger compartment. The adjustment component has a first leg and a cross leg. The cross leg is secured in the passenger compartment. A slot extends horizontally in the first leg with horizontal first alignment holes above and below the slot.

Next provided is a slide block. Bolts are provided coupling the slide block to the first alignment holes at a vertical position of comfort to a driver.

The brake pedal has an upper end pivotably coupled to the slide block. The brake pedal has a lower end adapted to be depressed by the driver.

Lastly, a foot pad is coupled to the lower end of the brake pedal. A plurality of elevationally spaced holes are provided in the brake pedal. Bolts couple the foot pad to the brake pedal at a horizontal position of comfort for the driver.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including such equivalent constructions insofar as they do not depart from the spirit and scope of the present invention.

It is therefore an object of the present invention to provide a new and improved adjustable pedal system which has all of the advantages of the prior art vehicle pedal systems of known designs and configurations of known designs and configurations and none of the disadvantages.

It is another object of the present invention to provide a new and improved adjustable pedal system which may be easily and efficiently manufactured and marketed.

It is further object of the present invention to provide a new and improved adjustable pedal system which is of durable and reliable constructions.

An even further object of the present invention is to provide a new and improved adjustable pedal system which is susceptible of a low cost of manufacture with regard to both materials and labor, and which accordingly is then susceptible of low prices of sale to the consuming public, thereby making such adjustable pedal system economically available to the buying public.

Lastly, it is another object of the present invention is to provide a adjustable pedal system which can be used for positioning pedals of a vehicle at a proper location for suiting a driver.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

The invention will be better understood and objects other than those set forth above will become apparent when consideration is given to the following detailed description thereof. Such description makes reference to the annexed drawings wherein:

FIG. 1 is a front elevational view of an adjustable pedal system constructed in accordance with the principles of the present invention.

FIG. 2 is a right side elevational view taken along line 2-2 of FIG. 1.

FIG. 3 is a plan view taken along line 3-3 of FIG. 2.

FIG. 4 is a left side elevational view taken along line 4-4 of FIG. 1.

The same reference numerals refer to the same parts throughout the various Figures.

DESCRIPTION OF THE PREFERRED EMBODIMENT

Figure 5:
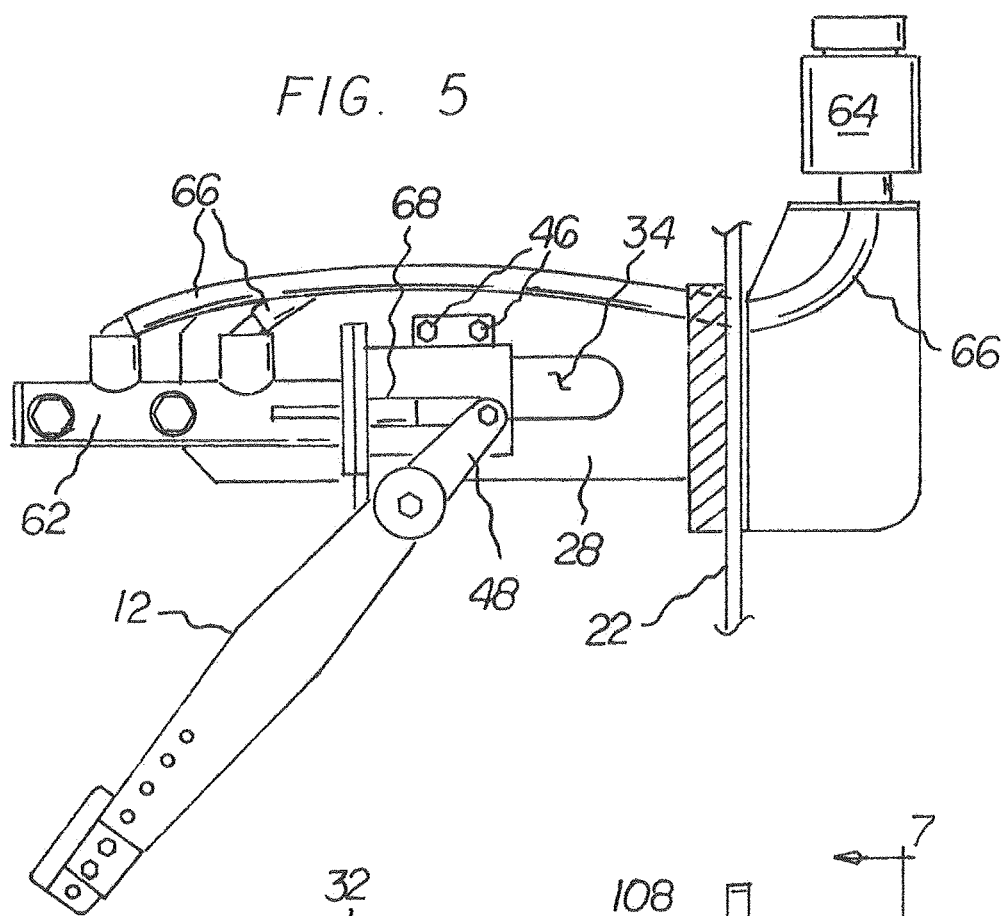
FIG. 5 is a cross sectional view taken along line 5-5 of FIG. 3.

With reference now to the drawings, and in particular to FIG. 1 thereof, the preferred embodiment of the new and improved adjustable pedal system embodying the principles and concepts of the present invention and generally designated by the reference numeral 10 will be described.

The present invention, the adjustable pedal system 10 is comprised of a plurality of components. In their broadest context such include a pedal, an adjustment component, a slide block, and a foot pad. Such components are individually configured and correlated with respect to each other so as to attain the desired objective.

In a first embodiment of the adjustable pedal system 10 first provided is a vehicle 16. The vehicle has a motor compartment 18 forwardly and a passenger compartment 20 rearwardly. A fire wall 22 is positioned generally vertically between the motor compartment and the passenger compartment. The passenger compartment has the brake pedal 12 for stopping the vehicle. The brake pedal has readily accessible adjustment mechanisms.

Next provided is an adjustment component 26 in the passenger compartment. The adjustment component has a U-shaped configuration with a left leg 28, a right leg 30, and a cross leg 32 between the left leg and the right leg. The cross leg is attached to the fire wall with the left leg and right leg extending rearwardly from the fire wall. A left slot 34 extends horizontally in the left leg. Horizontal left alignment holes 36 are provided in the left leg above and below the left slot. A right slot 38 extends horizontally in the right leg. Horizontal right alignment holes 40 are provided in the right leg above and below the right slot.

Next provided is a slide block 42. Four bolts 46 are provided coupling the slide block to the left alignment holes between at a vertical position of comfort to a driver. The slide block has a pin 44 extending through the left slot.

The brake pedal 12 has an upper end 48 pivotably coupled to the slide block. The brake pedal has a lower end 50 adapted to be depressed by the driver to stop the vehicle.

A brake foot pad 54 is coupled to the lower end of the brake pedal. A plurality of elevationally spaced holes 56 are provided in the brake pedal. Bolts 58 couple the brake foot pad to the brake pedal at a horizontal position of comfort for the driver.

Lastly, a master cylinder 62 is provided in the passenger compartment. The master cylinder is secured to and extends rearwardly from the slide block. Brake fluid containers 64 are provided in the motor compartment. Lines 66 are provided coupling the master cylinder and the brake fluid containers. A push rod 68 is provided. The push rod couples the brake pedal and the master cylinder to move brake fluid to stop the vehicle upon the driver depressing the brake foot pad.

Figure 6:
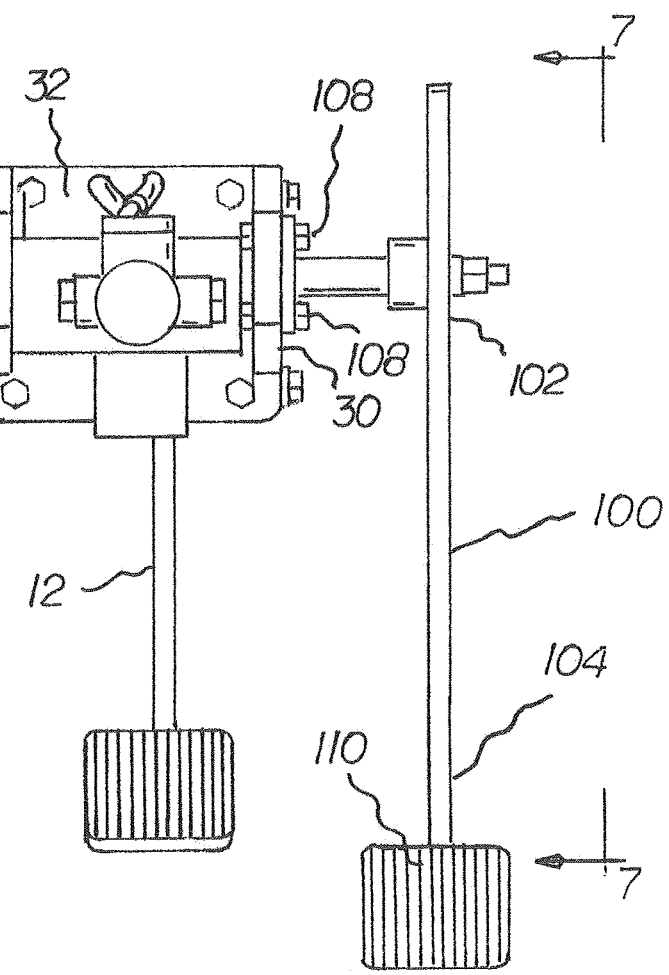
FIG. 6 is a front elevational view of an alternate embodiment of the invention.
Figure 7:
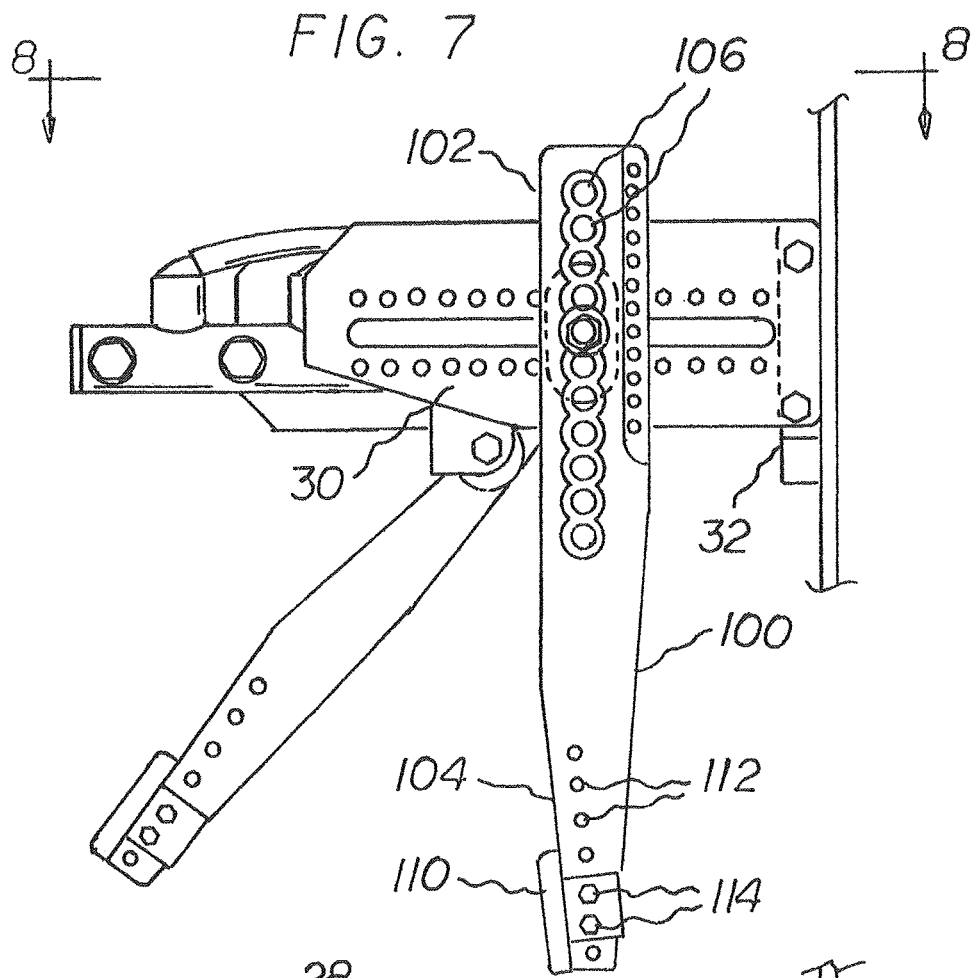
FIG. 7 a right side elevational view taken along line 7-7 of FIG. 6.
Figure 8:
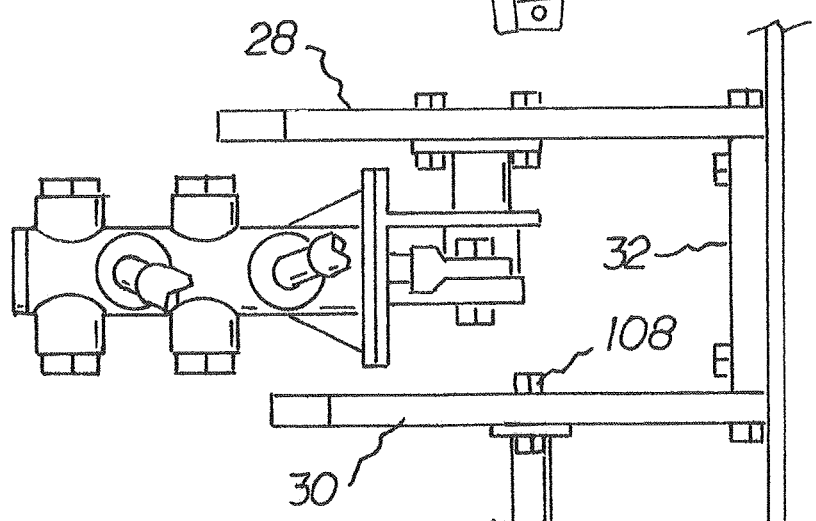
FIG. 8 is a plan view taken along line 8-8 of FIG. 7.
Figure 9:
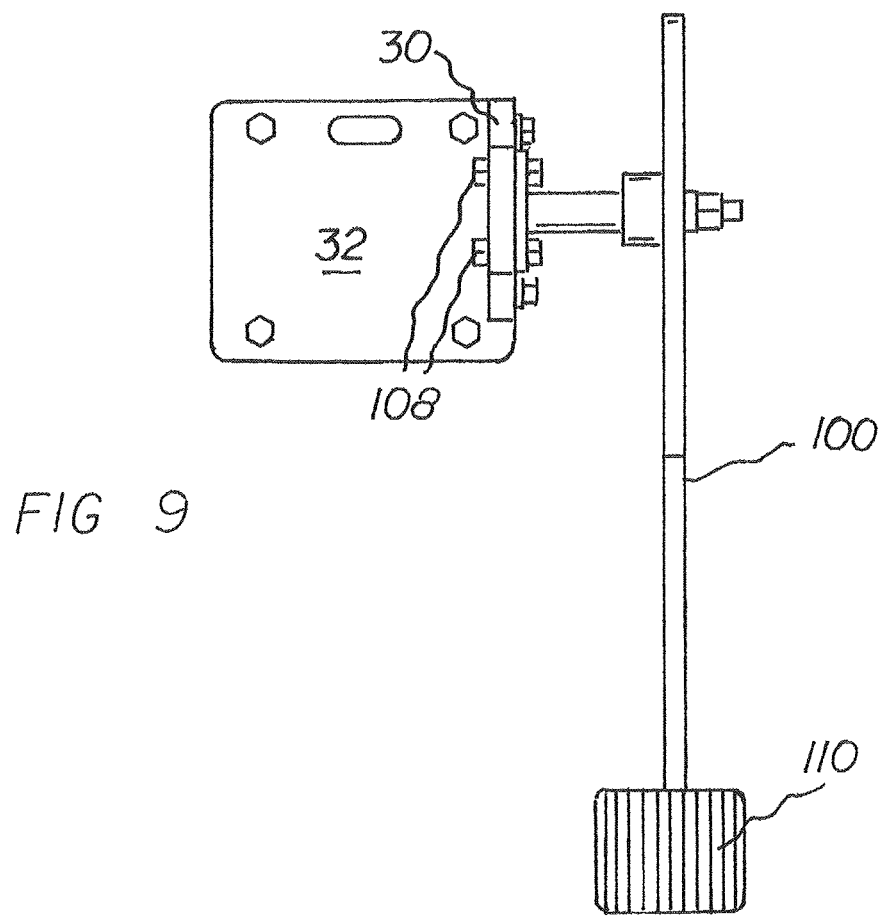
FIG. 9 is a front elevational view of an additional alternate embodiment of the invention. The same reference numerals refer to the same parts throughout the various Figures.
Figure 10:
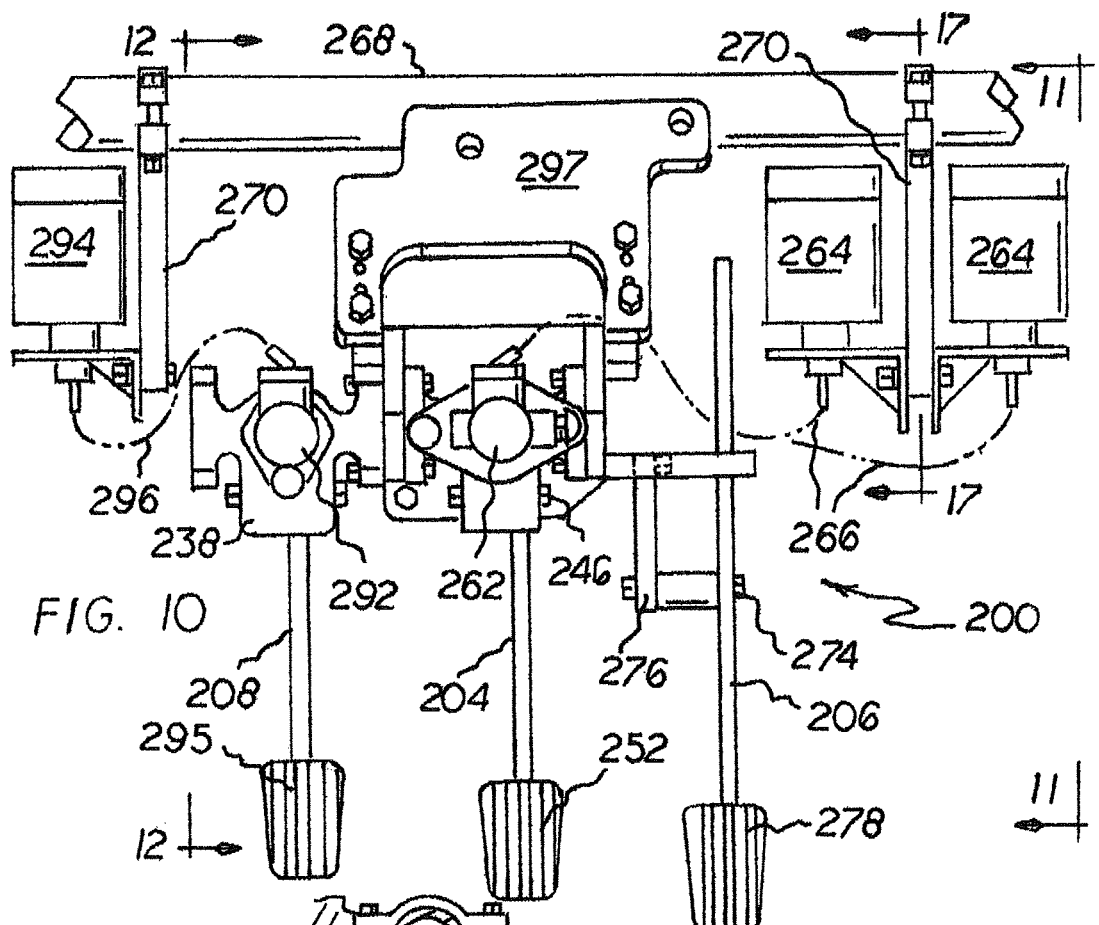
FIG. 10 is a front elevational view of a final embodiment of an adjustable vehicle pedal system constructed in accordance with the principles of the present invention.
Figure 11:
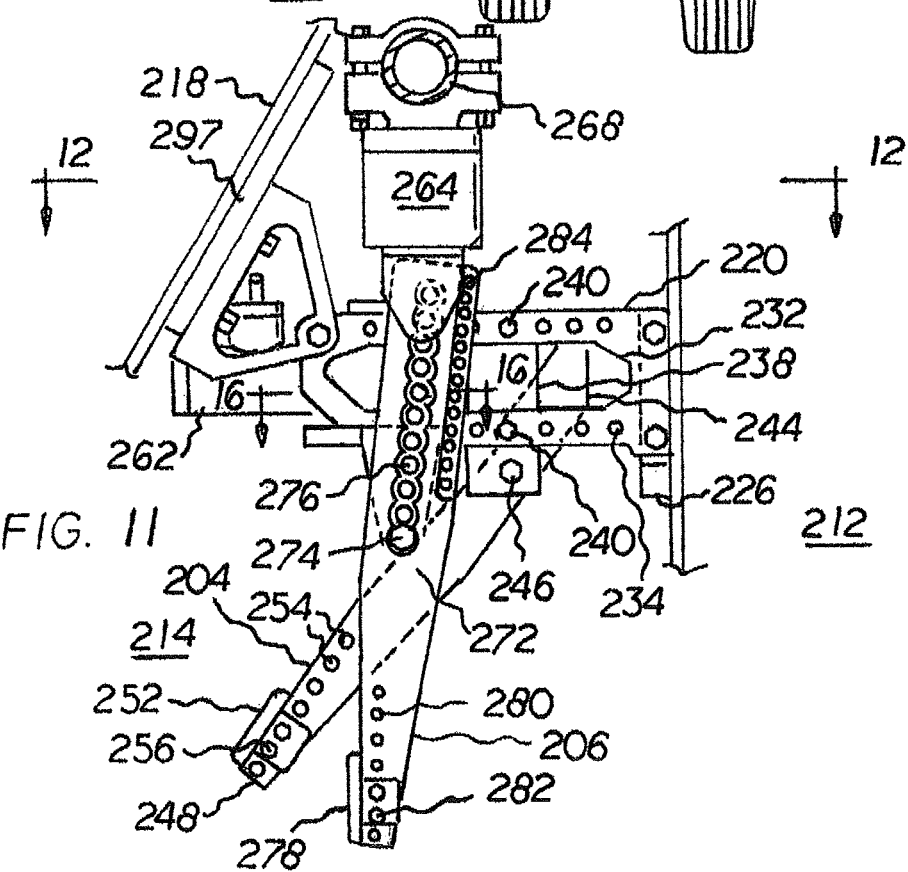
FIG. 11 is a right side elevational view taken along line 11-11 of FIG. 10.
Figure 12:
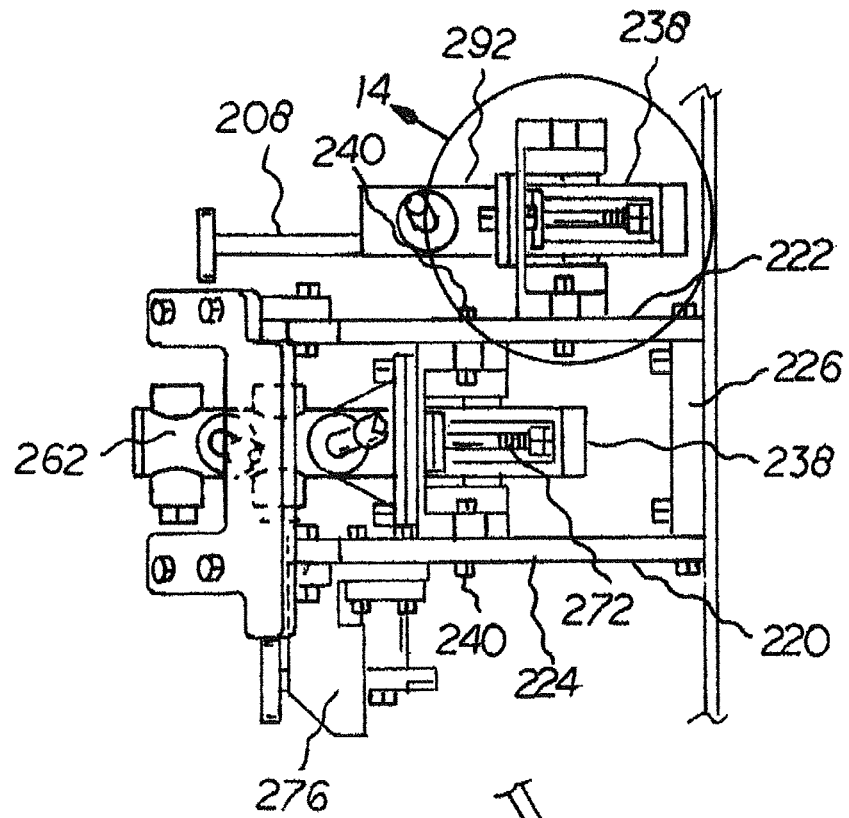
FIG. 12 is a plan view taken along line 12-12 of FIG. 11.
Figure 13:
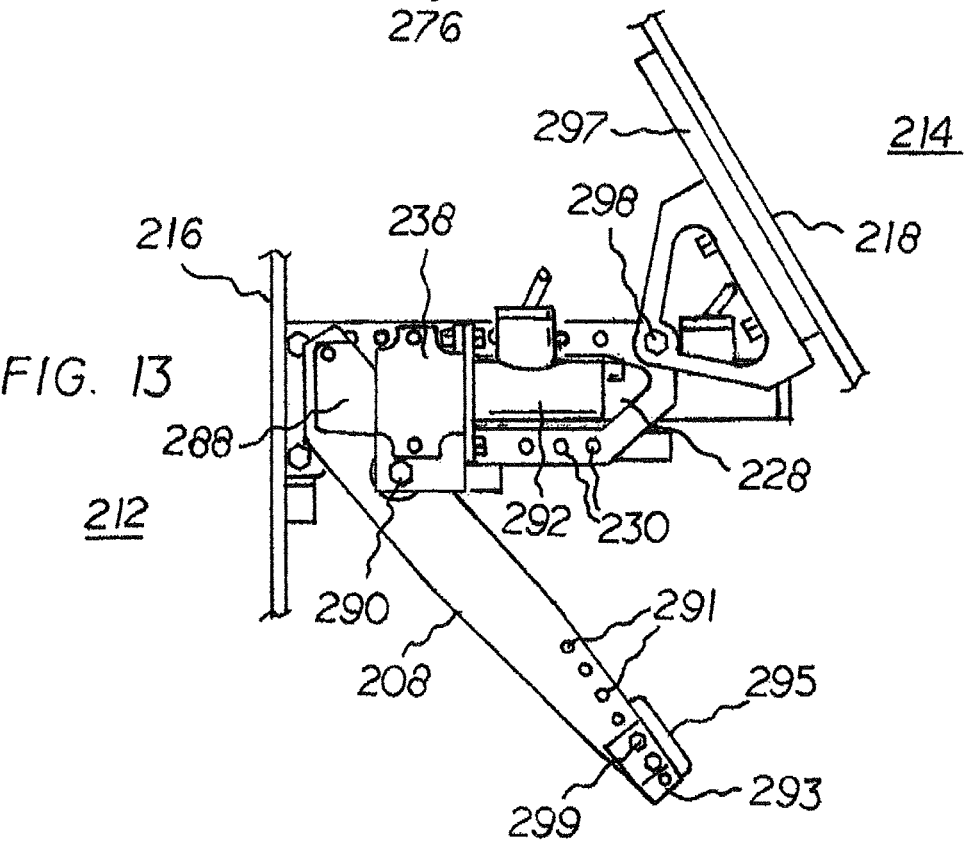
FIG. 13 is a left side elevational view taken along line 4-4 of FIG. 1.
Figure 14:
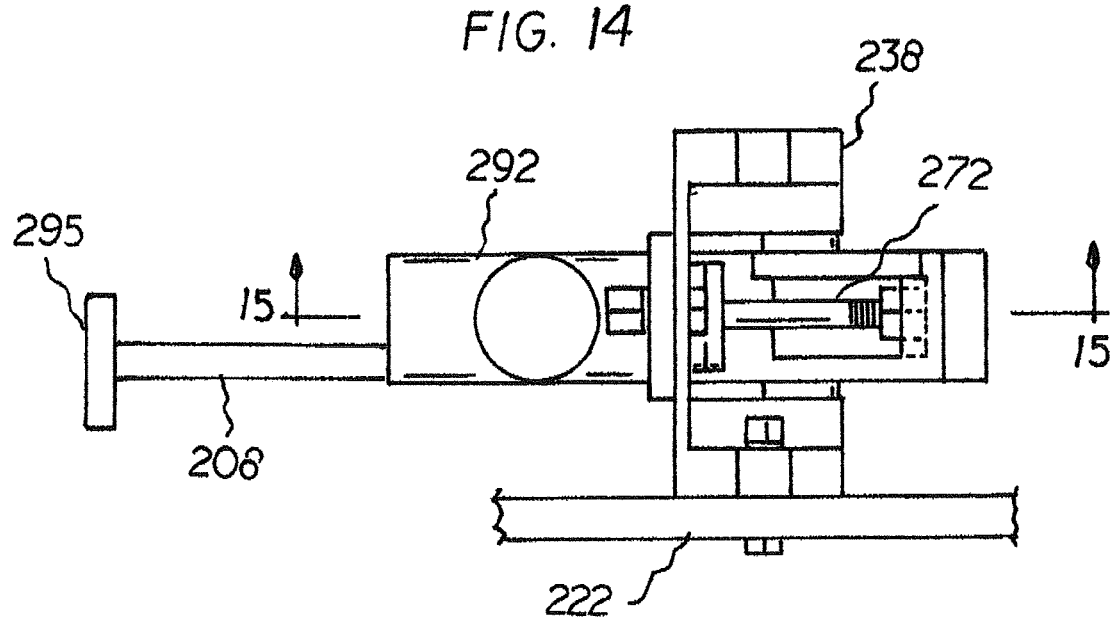
FIG. 14 is an enlarged showing taken at circle 14 of FIG. 12.
Figure 15:
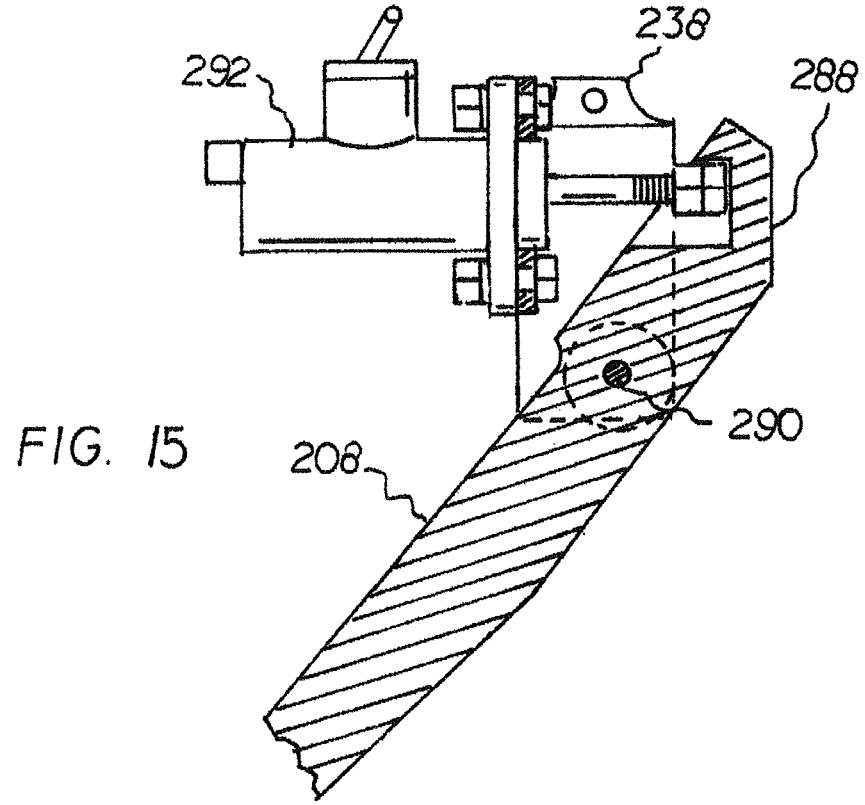
FIG. 15 is a cross sectional view taken along line 15-15 of FIG. 14.
Figure 16:
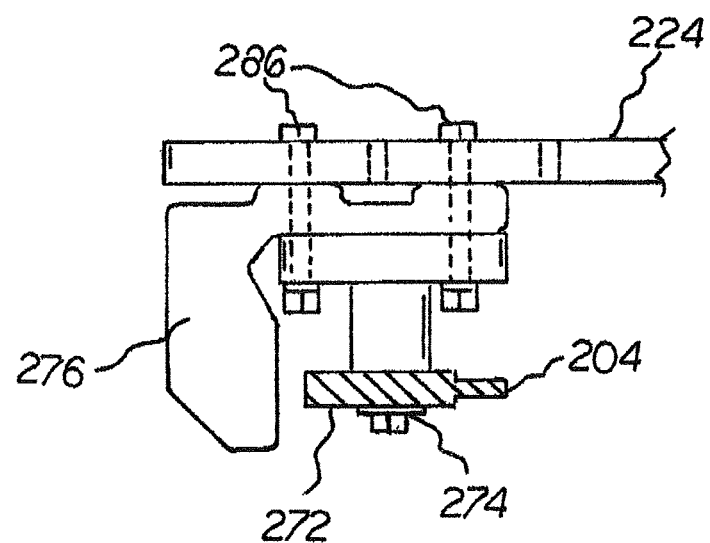
FIG. 16 is a cross sectional view taken along line 16-16 of FIG. 11.
Figure 17:
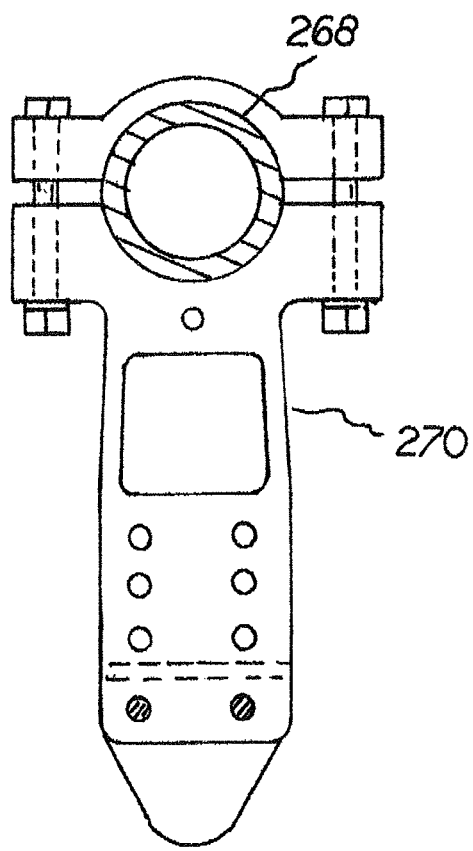
FIG. 17 is a cross sectional view taken along line 17-17 of FIG. 10.

Note that in FIGS. 1 through 5, the pedal is a brake pedal. In FIGS. 6 through 8 the system also includes a gas pedal. In FIG. 9, the pedal is a gas pedal.

Another embodiment of the invention includes a gas pedal 100 having an upper end 102 and a lower end 104. The upper end has a plurality of elevationally spaced upper holes 106. Two bolts 108 couple the gas pedal to the right leg of the adjustment component. A gas foot pad 110 with holes 112 is provided. Two bolts 114 couple the gas foot pad to the lower end of the gas pedal.

A final embodiment of the adjustable pedal system 208 is shown in FIGS. 10 through 17. In this embodiment, the system has adjustment mechanisms for positioning a brake pedal 204 and a gas pedal 206 and a clutch pedal 208 at a proper location for suiting a driver. In this final embodiment, first provided is the vehicle. The vehicle has a motor compartment 212 forwardly and a passenger compartment 214 rearwardly. A fire wall 216 is positioned generally vertically there between. The vehicle has a cowling 218.

The passenger compartment receives the brake pedal 204 for stopping the vehicle. The brake pedal has an adjustment component 220. The adjustment component has a U-shaped configuration with a left leg 222 and a right leg 224 and a cross leg 226 there between. The cross leg is attached to the fire wall with the left leg and right leg extending rearwardly there from. A left slot 228 extends horizontally in the left leg with horizontal left adjustment holes 230 there above and there below. A right slot 232 extends horizontally in the right leg with horizontal right adjustment holes 234 there above and there below.

Next provided in this final embodiment is an adjustment bracket 238 with bolts 240 adjustably coupling with left and right adjustment holes for positioning the brake pedal at a position of comfort.

The brake pedal 204 has a central extent 244 pivotably coupled to the adjustment bracket with a pivot point 246. The brake pedal has a lower end 248 adapted to be depressed by the driver to stop the vehicle.

Next, a brake foot pad 212 is provided. The brake foot pad is coupled to the lower end of the brake pedal. A plurality of elevationally spaced holes 254 in the brake pedal are provided with bolts 256 coupling the brake foot pad to the brake pedal at a position of comfort for the driver.

A master cylinder 262 is next provided. The master cylinder is secured to the adjustment bracket 238 and extends rearwardly there from. Brake fluid containers 264 are provided next. Lines 266 couple the master cylinder and the brake fluid containers. A roll bar 268 with a bracket 270 supports the brake fluid containers. A stationary push rod 252 is provided coupling the brake pedal and the master cylinder to move brake fluid to stop the vehicle upon depressing the brake foot pad.

The passenger compartment has the gas pedal 206 for powering the vehicle. The gas pedal 206 has a central extent with a pivot 274. A plurality of elevationally spaced upper holes 276 are provided above the pivot with additional holes for linking the gas pedal to a carburetor/throttle body. A bolt couples the gas pedal to the right leg of the adjustment bracket with a bracket 276 there between. Horizontally aligned adjustment holes 234 with bolts 286 couple the gas pedal to the right side of the adjustment bracket. A gas foot pad 278 is provided with holes 280 and bolts 282 coupling the gas foot pad to the gas pedal below the pivot.

The passenger compartment has the clutch pedal 208 for facilitating transmission shifting. The clutch pedal 208 is coupled to the adjustment bracket 238 to the left leg 222 by holes 230 for movement and adjustment of the clutch pedal. The clutch pedal has an upper end with a pivot 290 coupled to the adjustment bracket. A cylinder 292 is coupled to the adjustment bracket. A fluid reservoir 294 is supported by the roll bar by bracket 270 with fluid lines 296. A clutch pad 295 is attached to the clutch pedal.

A supplemental support bracket 297 is coupled to the cowling to reduce torque pressure when depressing the pedals. The supplemental support bracket is pivotably attached with left and right sides through bolts 298.

With this adjustable pedal system on the brake pedal, the master cylinder is coupled to the brake pedal allowing the brake pedal to be moved forwardly or rearwardly in the vehicle to accommodate the driver. Also, the accelerator gas pedal is fully adjustable—forwardly, backwardly, upwardly, downwardly, and side-to-side. The clutch pedal is also fully adjustable. This is a fully bolt-in unit that is also modular allowing the user to use just the brake portion, the accelerator gas pedal, or both as a completed unit. The foot pads on both pedals are adjustable allowing drivers to change the ratios which best suit them.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An adjustable pedal system comprising:
    a pedal for a vehicle, the vehicle having a passenger compartment, the pedal having readily accessible adjustment mechanisms;
    an adjustment component in the passenger compartment, the adjustment component having a first leg and a cross leg, the cross leg being secured in the passenger compartment, a slot extending horizontally in the first leg with horizontal first alignment holes above and below the slot;
    a slide block, with first bolts coupling the slide block to the first alignment holes at a vertical position of comfort;
    the pedal having an upper end pivotably coupled to the slide block, the pedal having a lower end adapted to be depressed by a driver; and
    a pad coupled to the lower end of the pedal, a plurality of elevationally spaced holes in the pedal with second bolts coupling the pad to the pedal at a horizontal position of comfort for the driver.

2. The system as set forth in claim 1 wherein the pedal is a brake pedal.

3. The system as set forth in claim 2 wherein the system also includes a gas pedal.

4. The system as set forth in claim 1 wherein the pedal is a gas pedal.

5. An adjustable brake pedal system (10) for a vehicle, the system having adjustment mechanisms for positioning a brake pedal (12) at a proper location for suiting a driver, the system comprising, in combination:
    a vehicle (16) having a motor compartment (18) forwardly and a passenger compartment (20) rearwardly and a fire wall (22) positioned generally vertically there between, the passenger compartment having the brake pedal (12) for stopping the vehicle;
    an adjustment component (26) in the passenger compartment, the adjustment component having a U-shaped configuration with a left leg (28) and a right leg (30) and a cross leg (32) there between, the cross leg being attached to the fire wall with the left leg and right leg extending rearwardly there from, a left slot (34) extending horizontally in the left leg with horizontal left alignment holes 36 there above and there below, a right slot (38) extending horizontally in the right leg with horizontal right alignment holes (40) there above and there below;
    a slide block (42), with four bolts (46) coupling the slide block to the left alignment holes at a vertical position of comfort, the slide block having a pin (44) extending through the left slot;

the brake pedal (12) having an upper end (48) pivotably coupled to the slide block, the brake pedal having a lower end (50) adapted to be depressed by a driver to stop the vehicle;

a brake foot pad (54) coupled to the lower end of the brake pedal, a plurality of elevationally spaced holes (56) in the brake pedal with bolts (58) coupling the brake foot pad to the brake pedal at a horizontal position of comfort for the driver; and a master cylinder (62) in the passenger compartment secured to the slide block and extending rearwardly there from, brake fluid containers (64) in the motor compartment, lines (66) coupling the master cylinder and the brake fluid containers, a push rod (68) coupling the brake pedal and the master cylinder to move brake fluid to stop the vehicle upon depressing the brake foot pad.

6. The system as set forth in claim 5 and further including:

a gas pedal (100) having an upper end (102) and a lower end (104), the upper end having a plurality of elevationally spaced upper holes (106) with two bolts (108) coupling the gas pedal to the right leg of the adjustment component, a gas foot pad (110) with holes (112) and two bolts (114) coupling the gas foot pad to the lower end of the gas pedal.

7. An adjustable pedal system (200) for a vehicle, the system having adjustment mechanisms for positioning a brake pedal (204) and a gas pedal (206) and a clutch pedal (208) at a proper location for suiting a driver, the system comprising, in combination:

the vehicle having a motor compartment (212) forwardly and a passenger compartment (214) rearwardly and a fire wall (216) positioned generally vertically there between, the vehicle having a cowling (218);

the passenger compartment receiving the brake pedal (204) for stopping the vehicle, the brake pedal having an adjustment component (220), the adjustment component having a U-shaped configuration with a left leg (222) and a right leg (224) and a cross leg (226) there between, the cross leg being attached to the fire wall with the left leg and right leg extending rearwardly there from, a left slot (228) extending horizontally in the left leg with horizontal left adjustment holes (230) there above and there below, a right slot (232) extending horizontally in the right leg with horizontal right adjustment holes (234) there above and there below;

an adjustment bracket (238) with bolts (240) adjustably coupling with left and right adjustment holes for positioning the brake pedal at a position of comfort;

the brake pedal (204) having a central extent (244) pivotably coupled to the adjustment bracket with a pivot point (246), the brake pedal having a lower end (248) adapted to be depressed by a driver to stop the vehicle;

a brake foot pad (212) coupled to the lower end of the brake pedal, a plurality of elevationally spaced holes (254) in the brake pedal with bolts (256) coupling the brake foot pad to the brake pedal at a position of comfort for the driver;

a master cylinder (262) secured to the adjustment bracket (238) and extending rearwardly there from, brake fluid containers (264), lines (266) coupling the master cylinder and the brake fluid containers, a roll bar (268) with a bracket (270) supporting the brake fluid containers, a stationary push rod (252) coupling the brake pedal and the master cylinder to move brake fluid to stop the vehicle upon depressing the brake foot pad;

the passenger compartment having the gas pedal (206) for powering the vehicle, the gas pedal (206) having a central extent with a pivot (274), a plurality of elevationally spaced upper holes (276) above the pivot with additional holes for linking the gas pedal to the a carburetor/throttle body, a bolt coupling the gas pedal to the right leg of the adjustment bracket with a bracket (276) there between, horizontally aligned adjustment holes (234) with bolts (286) coupling the gas pedal to the right side of the support bracket, a gas foot pad (278) with holes (280) and bolts (282) coupling the gas foot pad to the gas pedal below the pivot;

the passenger compartment having the clutch pedal (208) for facilitating transmission shifting, the clutch pedal (208) being coupled to the adjustment bracket (238) to the left leg (222) by holes (230), the clutch pedal having an upper end with a pivot (290) coupled to the adjustment bracket, a cylinder (292) coupled to the adjustment bracket and a fluid reservoir (294) supported by the roll bar by bracket 270 with fluid lines (296), a clutch pad (295) attached to the clutch pedal; and a supplemental support bracket (297) coupled to the cowling to reduce torque pressure when depressing the pedals, the supplemental support bracket being pivotably attached with left and right sides through bolts (298).

* * * * *